United States Patent
Yubamoto et al.

(10) Patent No.: US 10,216,593 B2
(45) Date of Patent: Feb. 26, 2019

(54) DISTRIBUTED PROCESSING SYSTEM FOR USE IN APPLICATION MIGRATION

(71) Applicant: HITACHI, LTD., Tokyo (JP)

(72) Inventors: Jun Yubamoto, Tokyo (JP); Tatsuhiko Miyata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 135 days.

(21) Appl. No.: 15/311,974

(22) PCT Filed: Apr. 24, 2015

(86) PCT No.: PCT/JP2015/062465
§ 371 (c)(1),
(2) Date: Nov. 17, 2016

(87) PCT Pub. No.: WO2015/178159
PCT Pub. Date: Nov. 26, 2015

(65) Prior Publication Data
US 2017/0123941 A1   May 4, 2017

(30) Foreign Application Priority Data
May 19, 2014 (JP) ................... 2014-102958

(51) Int. Cl.
| G06F 11/20 | (2006.01) |
| G06F 9/50 | (2006.01) |
| G06F 11/00 | (2006.01) |
| G06F 9/48 | (2006.01) |
| G06F 9/52 | (2006.01) |
| G06F 8/656 | (2018.01) |

(52) U.S. Cl.
CPC .......... G06F 11/203 (2013.01); G06F 8/656 (2018.02); G06F 9/4856 (2013.01); G06F 9/50 (2013.01); G06F 9/52 (2013.01); G06F 11/00 (2013.01); G06F 11/20 (2013.01); *G06F 2201/805* (2013.01)

(58) Field of Classification Search
CPC ................. G06F 11/14; G06F 15/16
USPC .......................................... 714/15
See application file for complete search history.

(56) References Cited

U.S. PATENT DOCUMENTS

| 2007/0294684 A1* | 12/2007 | Kumashiro | ............... G06F 8/65 717/168 |
| 2009/0300182 A1* | 12/2009 | Ueno | .................... H04L 67/24 709/226 |
| 2010/0088417 A1* | 4/2010 | Amemiya | ........... H04L 67/1027 709/227 |

(Continued)

FOREIGN PATENT DOCUMENTS

| JP | 2007-053474 A | 3/2007 |
| JP | 2007-334636 A | 12/2007 |

(Continued)

*Primary Examiner* — Kamini B Patel
(74) *Attorney, Agent, or Firm* — Volpe and Koenig, P.C.

(57) ABSTRACT

Provided is a distributed processing system in which migration evaluation is performed based on performance information, statistical information of each process of an application, and the number of non-completed processes of each process of an application for an application server in which an old application is being operated, a migration target server group is decided so that migration is completed in a shortest period of time, and migration to a new application is performed in a stepwise manner.

8 Claims, 13 Drawing Sheets

(56) References Cited

U.S. PATENT DOCUMENTS

| | | | |
|---|---|---|---|
| 2011/0040892 A1* | 2/2011 | Amemiya | H04L 67/1027 709/235 |
| 2011/0107156 A1* | 5/2011 | Miyata | G06F 9/54 714/49 |
| 2015/0277974 A1* | 10/2015 | Beale | G06F 9/4856 714/19 |

FOREIGN PATENT DOCUMENTS

| | | |
|---|---|---|
| JP | 2008-225793 A | 9/2008 |
| JP | 2011-096045 A | 5/2011 |
| JP | 2011-142568 A | 7/2011 |

* cited by examiner

Fig. 7

| ITEM NO. | PROCESS NAME | AVERAGE PROCESSING PERIOD OF TIME | AVERAGE CPU PERIOD OF TIME | AVERAGE MEMORY USAGE | NUMBER OF NON-COMPLETED PROCESSES |
|---|---|---|---|---|---|
| 1 | PROCESS A | 121 MILLI-SECONDS | 15 MILLI-SECONDS | 1MB | 15 |
| 2 | PROCESS B | 568 MILLI-SECONDS | 65 MILLI-SECONDS | 3MB | 126 |
| 3 | PROCESS C | 158 MILLI-SECONDS | 6 MILLI-SECONDS | 2MB | 48 |

Fig. 8

| MAXIMUM OF NUMBER OF PARALLEL EXECUTIONS | NUMBER OF CPU CORES | MEMORY AMOUNT |
|---|---|---|
| 32 | 4 | 8000MB |

Fig. 10

| ITEM NO. | APPLICATION SERVER NAME | STATUS |
|---|---|---|
| 1 | APPLICATION SERVER 102 | NEW APPLICATION IN OPERATION |
| 2 | APPLICATION SERVER 103 | NEW APPLICATION IN OPERATION |
| 3 | APPLICATION SERVER 104 | STANDBY FOR COMPLETION OF ALL PROCESSES |
| 4 | APPLICATION SERVER 105 | OLD APPLICATION IN OPERATION |

Fig. 15

CLIENT->PROCESS A ADAPTER->PROCESS A->PROCESS B ADAPTER->PROCESS B->PROCESS C ADAPTER->PROCESS C

DISTRIBUTED PROCESSING SYSTEM FOR USE IN APPLICATION MIGRATION

This application claims the benefit of Japanese Priority Patent Application JP 2014-102958 filed May 19, 2014, the entire contents of which are incorporated herein by reference.

TECHNICAL FIELD

The present invention relates to efficient application migration of a distributed processing system using a distributed execution platform.

BACKGROUND ART

A platform of applying a distributed execution technique employed in data processing such as Hadoop (a registered trademark in the United States of America and other countries) to an application server of a backbone system and implementing high scalability (hereinafter, referred to as a "distributed execution platform" is known.

For a distributed processing system, for example, Patent Document 1 discloses a technique in which a plurality of client servers, a plurality of web servers, a plurality of database servers, and a plurality of application servers are provided, a table in which load distribution patters of servers are written is provide, and a load is distributed according to the table. Further, it is stated that a device of monitoring a failure of a web server is provided, and a table in which a server used as an alternative server when a failure occurs is written is provided. A high reliable system in which a load of a server is easily distributed accordingly, and an operation can be performed even when a failure occurs in a server is disclosed.

CITATION LIST

Patent Document

Patent Document 1: JP 2008-225793 A

SUMMARY OF THE INVENTION

Problems to be Solved by the Invention

In the distributed processing system, when application migration is performed, a process of selecting some application servers among a plurality of application servers serving as a migration target, causing the application servers to enter a state in which a new processing request is not received (hereinafter, referred to as "prior blockage"), switching an application when all processes in the application servers are completed, newly selecting some application servers and causing the application servers to enter the prior blockage, and then switching an application is repeatedly performed, so that migration from an old application to a new application is performed. For this reason, it is a degeneracy state, but it is possible to perform application migration while maintaining an operation of the distributed processing system. However, there is a long wasted time in application migration, and thus a degeneracy period of time is increased.

As a first cause, there are cases in which, when application servers of the migration target are selected, servers that are determined to be able to migrate rapidly based on load states such as CPU usage rates of application servers can be selected, but servers having a short migration period of time are not guaranteed to be necessarily selected based on the load states of the servers, and thus the degeneracy period of time is increased.

As a second cause, it is difficult to check whether or not all processes are completed after the prior blockage of the application servers of the migration target unless an application manages a processing server name and a processing status in a database (DB) or the like. For this reason, a migration timing is decided based on transition of a usage rate of a CPU or a memory, and thus a useless time is wasted, and the degeneracy period of time is increased.

As a third cause, in the distributed processing system according to the related art, the load distribution is performed by distributing requests from client terminals, and all processes are performed such that a process for one request is performed by one application server, and thus it is necessary to be on standby until all processes for requests received until the prior blockage are completed.

In this regard, it is an object of the present invention to solve at least one of the above three problems and implement application migration in a short period of time.

Solutions to Problems

In order to solve at least one of the above three problems, provided is a distributed processing system which includes:
a plurality of application servers; and
a management device,
wherein the application server includes an application portion and a distributed execution platform portion,
the application portion includes
an adapter unit that receives an execution request of an application from a client terminal, and transmits a message of a processing request of the application to the distributed execution platform portion, and
a processor unit that performs a process of the application in response to a request from the distributed execution platform,
the distributed execution platform portion includes
a dispatcher unit that holds the message transmitted from the adapter unit, and selects an application server that performs the process of the application requested through the message according to a routing strategy, and
a statistical information storage unit that holds statistical information of each process of the application by the application server, and
the management device includes
a migration management unit that manages a migration status of the application for every two or more application servers, and
a migration evaluating unit that decides a migration target server group based on performance information of the application server, statistical information of each process of the application, and the number of non-completed processes of each process calculated based on the number of messages held in the dispatcher unit for the application server in which the migration status is an old application operation state.

Effects of the Invention

According to the present invention, it is possible to reduce a degeneracy period of time of a system when application migration is performed.

BRIEF DESCRIPTION OF THE DRAWINGS

FIG. 7 is a diagram illustrating an example of statistical information and the number of non-completed processes included in server information.

FIG. 8 is a diagram illustrating an example of server performance information included in server information.

FIG. 10 is a diagram illustrating an example of a migration status management table.

FIG. 15 is a diagram illustrating an example of an application flow file.

MODE FOR CARRYING OUT THE INVENTION

Hereinafter, the present embodiment will be described with reference to the appended drawings.

Figure 1:
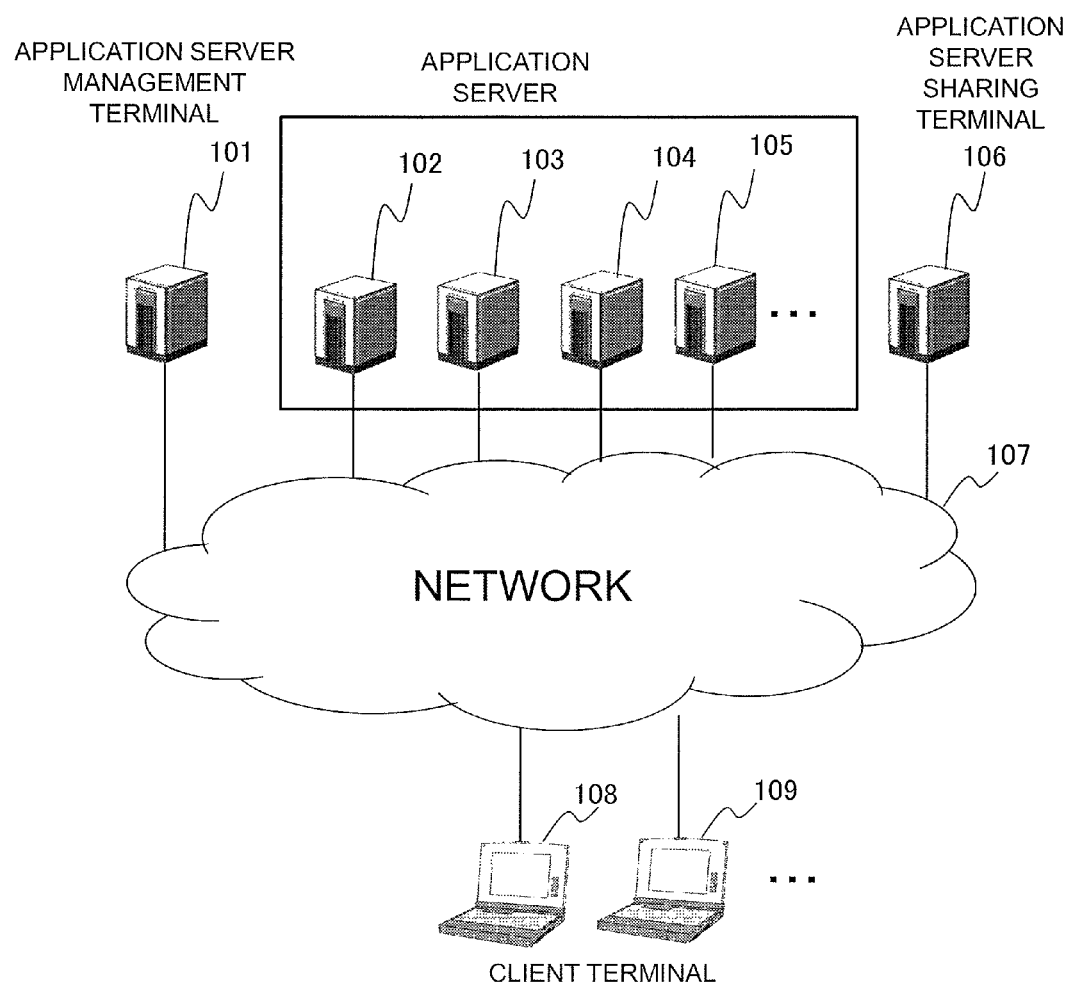
FIG. 1 is a diagram illustrating an exemplary configuration of a distributed processing system.

FIG. 1 is a diagram illustrating an exemplary configuration of a distributed processing system. An application server management terminal 101, application servers 102, 103, 104, and 105, an application server sharing terminal 106, and client terminals 108 and 109 are connected to a network 107, and communication between terminals is performed via the network 107. Various kinds of applications operate on a distributed execution platform implemented in the application servers 102 to 105, and applications operate in response to requests from the client terminals 108 and 109. The application server management terminal 101 is a terminal that controls migration from an application operating in the application servers 102 to 105 to a new application. The application server sharing terminal 106 is a terminal that manages status of the application servers 102 to 105. The number of application servers 102 to 105 is not limited to four, and it is desirable to arrange a desired number of application servers.

Figure 2:
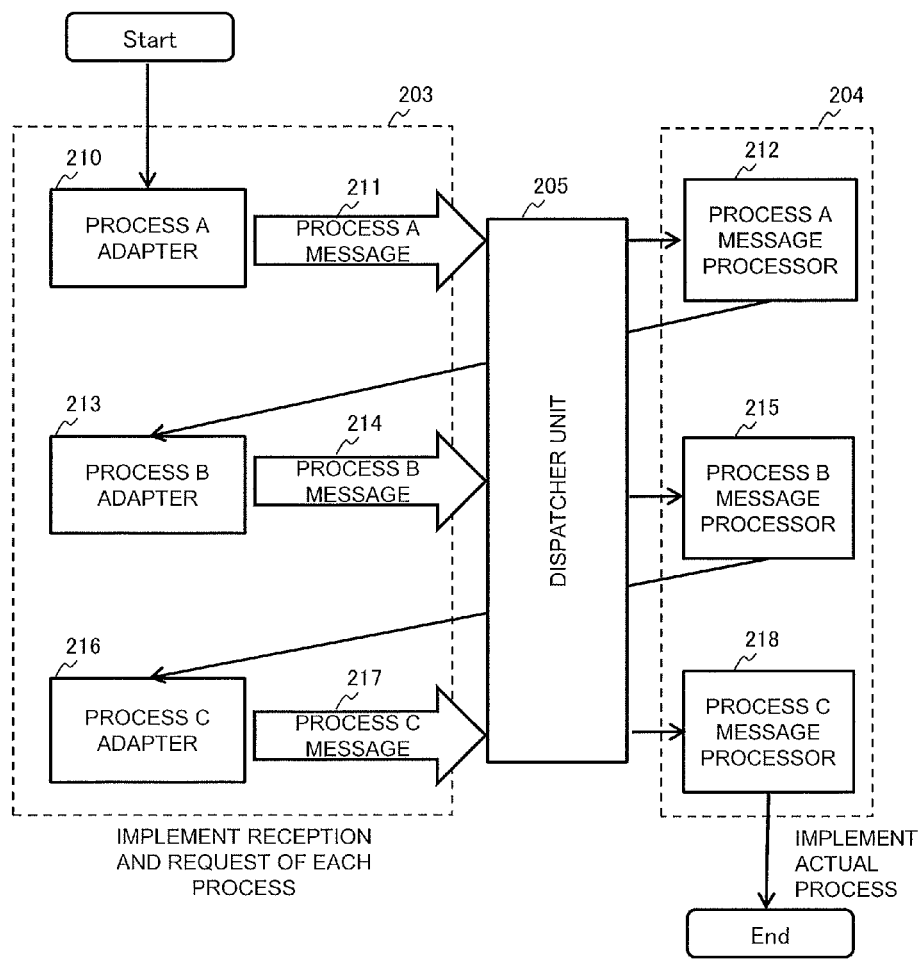
FIG. 2 is a diagram illustrating an exemplary process flow of an application developed on a distributed execution platform.

FIG. 2 is a diagram illustrating an exemplary process flow of an application developed on the distributed execution platform in advance. For example, it is an application that operates when a new contract application request for a mobile phone or the like is received from a client terminal, A reception process for the new contract application request is referred to as a "process A," a process related to a business procedure for the new contract application request is referred to as a "process B," and a completion process for the new contract application request is referred to as a "process C."

Each process of an application includes an adapter that receives a processing request, a message for giving a notification indicating execution of a process to a dispatcher unit 205 of the distributed execution platform, and a message processor that performs an actual process of an application, and notifies the adapter of an execution request for a subsequent process when there is a subsequent process and is developed to sequentially execute a flow process of an application through a combination thereof.

An operation of an application flow will be described below. First, a process A adapter 210 is on standby in a state in which a channel for receiving a request from the outside is opened, and when a request is received from the client terminal 108 or 109 via the network 107, the process A adapter 210 generates a process A message 211 in response to the request, and transmits the process A message 211 to the dispatcher unit 205 of the distributed execution platform.

Then, the dispatcher unit 205 requests a corresponding process A message processor 212 to process the process A message 211. The process A message processor 212 performs an actual process of the process A, and transmits an execution request for the process B serving as a subsequent process to a process B adapter 213 when the actual process is completed.

Then, the process B adapter 213 newly generates a process B message 214, and transmits the process B message 214 to the dispatcher unit 205 of the distributed execution platform. The dispatcher unit 205 requests a corresponding process B message processor 215 to process the process B message 214. The process A message processor 215 performs an actual process of the process B, and transmits an execution request for the process C serving as a subsequent process to a process B adapter 216 when the actual process is completed.

Then, the process C adapter 216 newly generates a process C message 217, and transmits the process C message 217 to the dispatcher unit 205 of the distributed execution platform. The dispatcher unit 205 requests a corresponding process C message processor 218 to process the process C message 217. The process C message processor 218 performs an actual process of the process C, and ends the process since there is no subsequent process.

Although the details will be described later, the process A adapter 210, the process B adapter 213, the process C adapter 216, the process A message processor 212, the process B message processor 215, and the process C message processor 218 can operate on different application servers 102 to 105. As described above, when a request (for example, a new contract application request for a mobile phone or the like) is received from a client terminal, in the distributed processing system according to the related art, all a series of processes for the request are performed in a predetermined application server, but according to the present embodiment, the request from the client terminal is divided into the process A (for example, the reception process), the process B (for example, the business process), and the process C (for example, the completion process), and thus the respective processes can be performed in different application servers.

Figure 3:
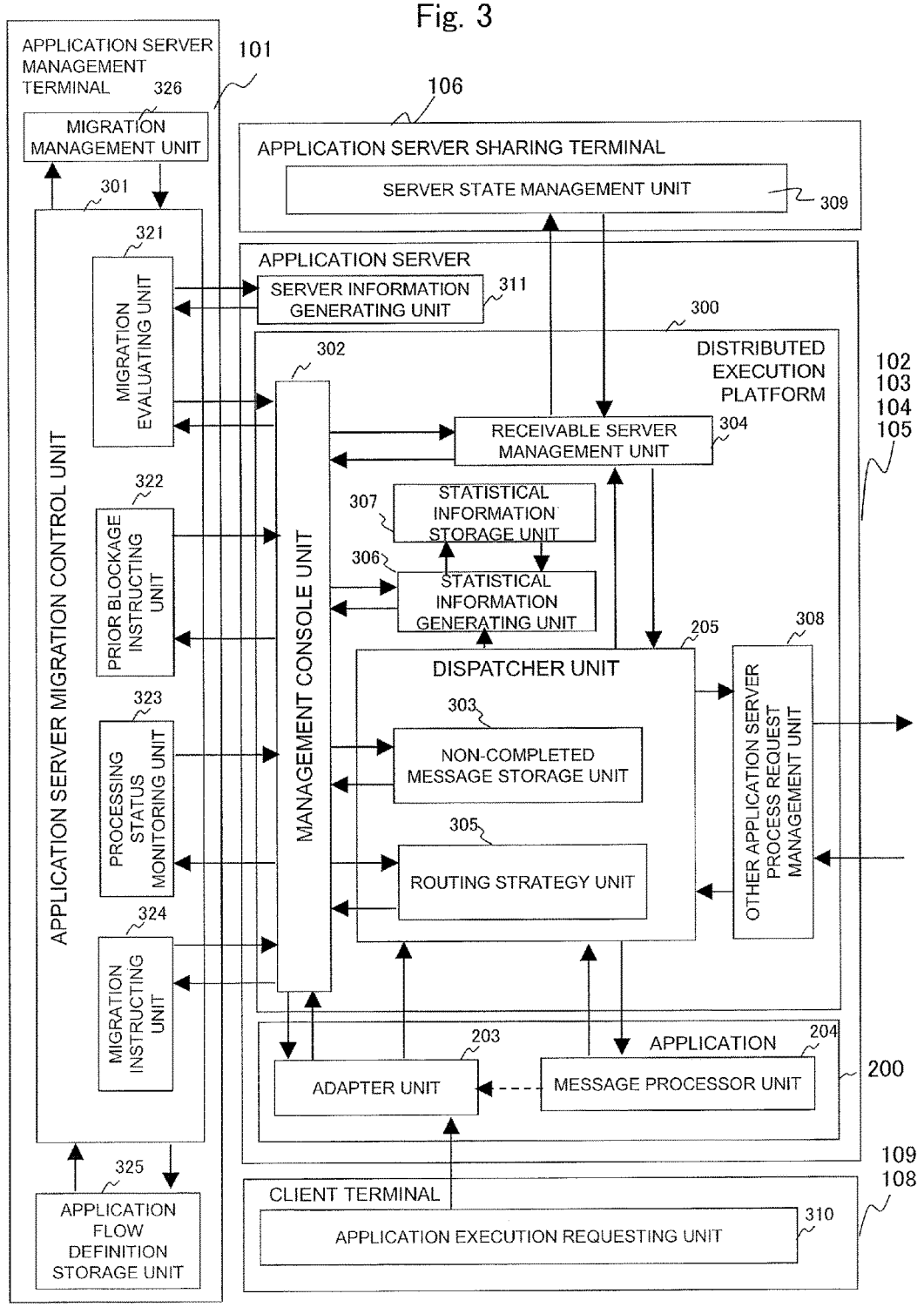
FIG. 3 is a functional block diagram illustrating an example of a distributed processing system using a distributed execution platform.

FIG. 3 is a functional block diagram illustrating an example of the distributed processing system using the distributed execution platform. Each of the application servers 102 to 105 includes an application 200, a distributed execution platform 300, and a server information generating unit 311. The application 200 includes an adapter unit 203 and a message processor unit 200, and the adapter unit 203 includes, for example, a plurality of adapters such as the process A adapter 210, the process B adapter 213, and the process C adapter 216 described above with reference to FIG. 2. The message processor unit 200 also includes a plurality of message processors such as the process A message processor 212, the process B message processor 215, and the process C message processor 218 described above with reference to FIG. 2.

The distributed execution platform 300 includes a management console unit 302, a receivable server management unit 304, a statistical information generating unit 306, a statistical information storage unit 307, an other-application server process request management unit 308, and a dispatcher unit 205. The dispatcher unit 205 is a function unit corresponding to the dispatcher unit 205 described above with reference to FIG. 2, and includes a non-completed message storage unit 303 and a routing strategy unit 305.

The application server management terminal 101 includes an application server migration control unit 301, an application flow defining unit 325, and a migration management unit 326, and the application server migration control unit 301 includes a migration evaluating unit 321, a prior blockage instructing unit 322, a processing status monitoring unit 323, and a migration instructing unit 324. Each of the client terminals 108 and 109 includes an application execution requesting unit 310, and the application server sharing terminal 106 includes a server state management unit 309. The server state management unit 309 manages states of all the application servers 102 to 105, and holds various kinds of states, for example, when each application server is in a busy state or a processing request non-receivable state due to the prior blockage.

Here, execution of an application using a distributed processing scheme according to the present embodiment will be described.

First, when an application execution request is transmitted from the application execution requesting unit 310 of the client terminal 108 to the application server 102, the adapter unit 203 (the process A adapter 210 in FIG. 2) that has received the application execution request generates a processing request message of an application, and gives a notification indicating the processing request message to the dispatcher unit 205 of the distributed execution platform 300.

The dispatcher unit 205 that has received the notification first stores the message in the non-completed message storage unit 303. Then, the dispatcher unit 205 transmits an inquiry about an application server that can receive a processing request of an application to the receivable server management unit 304. The receivable server management unit 304 regularly performs communication with the server state management unit 309 of the application server sharing terminal 106, and detects the states of the other application servers, and thus, for example, when there is an application server in the busy state, the receivable server management unit 304 transmits a response indicating receivable application servers that can receive it excluding the server to the dispatcher unit 205. Its own application server is necessarily included in the receivable application servers.

Then, the dispatcher unit 205 that receives the response indicating the receivable servers gives a notification indicating the receivable servers to the routing strategy unit 305, and executes a routing strategy to select one server that executes a process among a plurality of receivable servers (hereinafter, referred to as "execution servers"). When the execution server is only its own server, the dispatcher unit 205 requests the message processor unit 204 (the process A message processor 212 in FIG. 2) to perform a process, and when a process completion notification is received from the message processor unit 204, the processing request message stored in the non-completed message storage unit 303 is deleted. Further, the dispatcher unit 205 notifies the statistical information generating unit 306 of a processing period of time for the process or the like, and stores the processing period of time in the statistical information storage unit 307. As the routing strategy, an arbitrary algorithm such as a scheme of selecting one execution server among a plurality of receivable servers including its own server in a round-robin fashion or selecting an execution server based on a hash value of predetermined information included in the processing request message of the application can be employed.

On the other hand, when the execution server selected by the routing strategy unit 305 is not its own server, the dispatcher unit 205 does not transmit the processing request to the message processor unit 204 of its own application server but transmits the processing request to the other-application server process request management unit 308 that performs transmission and reception of the processing request with other application servers, and deletes the processing request message stored in the non-completed message storage unit 303.

The other-application server process request management unit 308 transmits the process request to the execution server, the other-application server process request management unit 308 of the execution server notifies the dispatcher unit 205 of the process request, and the processing request message is stored in the non-completed message storage unit 303. The dispatcher unit 205 of the execution server transmits the processing request to the message processor unit 204 of its own application server, and deletes the processing request message stored in the non-completed message storage unit 303 when the process completion notification is received from the message processor unit 204. Further, the dispatcher unit 205 of the execution server notifies the statistical information generating unit 306 of the processing period of time for the process or the like, and stores the processing period of time for the process or the like in the statistical information storage unit 307.

After the actual process for the processing request of the application is performed, when there is a process subsequent to the process, the message processor unit 204 transmits an execution request for the subsequent process to the adapter unit 203 (the process B adapter 213 in FIG. 2), and makes a request to perform a subsequent process of the application. The above process is performed until there is no subsequent process of the application.

Next, the description will proceed with an operation of the application server management terminal 101 when migration from an old application operating in the application servers 102 to 105 to a new application is performed. The application server migration control unit 301 of the application server management terminal 101 is connected with the server information generating units 311 and the management console units 302 of all the application servers 102 to 105.

Further, a file in which information specifying the adapter unit 203 that receives the requests from the client terminals 108 and 109 (the process A adapter 210 in FIG. 2) and information for a process execution order of an application are defined (hereinafter, referred to as an "application flow file") is stored in the application flow definition storage unit 325 and used by the migration evaluating unit 321 and the prior blockage instructing unit 322.

FIG. 15 is a diagram illustrating an example of the application flow file. A request from the client terminal is received by the process A adapter, and the process is performed in the described order of the process A, the process B adapter, the process B, the process C adapter, and the process C.

The migration management unit 326 manages a migration status from an old application to a new application in the application servers 102 to 105, and holds a migration status management table which will be described later.

The migration evaluating unit 321 acquires various kinds of information necessary for migration evaluation from an application server in which an old application is being operated. Specifically, the migration evaluating unit 321 acquires performance information of the server from the server information generating unit 311 of the application server, acquires statistical information of each process of the old application from the statistical information generating unit 306 through the management console 302, and acquires the number of processes which are not completed (hereinafter, referred to as "the number of non-completed processes") from the non-completed message storage unit 303. The number of non-completed processes is the number of processing request messages of the application held in the non-completed message storage unit 303. Further, the migration evaluating unit 321 acquires the process execution order of the old application from the file stored in the application flow definition storage unit 325, and performs migration evaluation based on various kinds of information which is acquired. Although the details will be described later, in the migration evaluation, an application server that migrates to a new application among the application servers in which the old application is being operated is decided.

The prior blockage instructing unit 322 specifies an adapter that receives the requests from the client terminals 108 and 109 (hereinafter, referred to as an "external request receiving adapter") based on the application flow file of the old application, gives an external request receiving adapter stop instruction to the adapter unit 203 through the management console unit 302 of the application server in which the migration is decided to be performed by the migration evaluation, and prevents reception of the processing request of the old application from the client terminals 108 and 109. In the case of the example of FIG. 15, the external request receiving adapter is the process A adapter.

Then, the prior blockage instructing unit 322 gives a node blockage instruction to the receivable server management unit 304, and thus the receivable server management unit 304 gives an instruction to cause the application server of the migration target to a "non-receivable state" to the server state management unit 309 of the application server sharing terminal 106. Then, the prior blockage instructing unit 322 gives a routing strategy change instruction to the routing strategy unit 305, and changes a logic of selecting a server that performs a process among a plurality of servers. Specifically, the routing strategy is changed such that, when there are a plurality of application servers that can receive a process, a server other than its own server is selected.

The processing status monitoring unit 323 acquires the number of non-completed processes from the non-completed message storage unit 303 through the management console unit 302 of the application server to which the prior blockage instructing unit 322 gives the prior blockage instruction, and monitors if there is no process in the application server.

When the processing status monitoring unit 323 determines that there is no process in the application server, the migration instructing unit 324 gives an instruction to undeploy the old application and deploy the new application through the management console unit 302 so that the application migration is performed.

Figure 4:
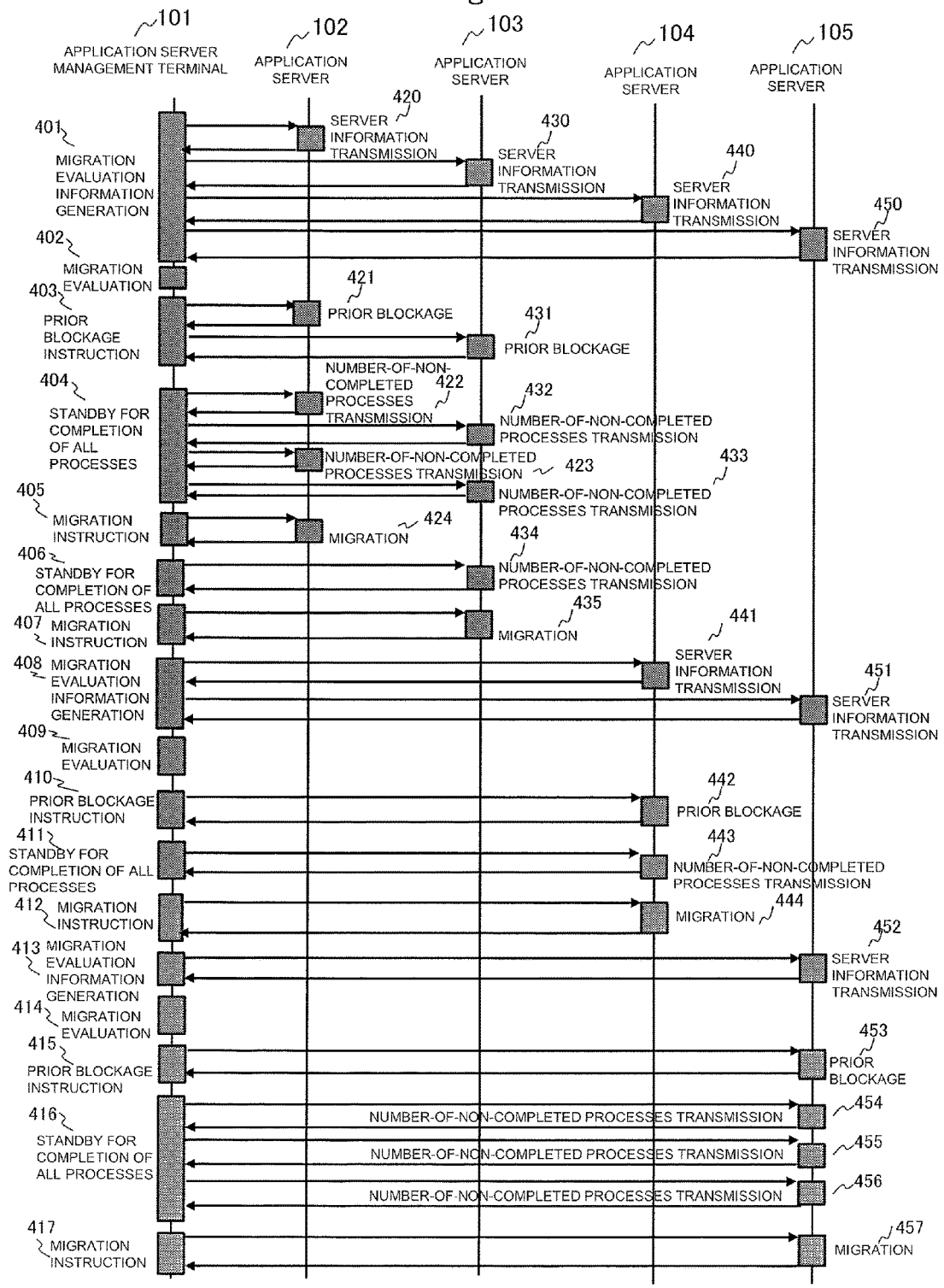
FIG. 4 is a diagram illustrating an exemplary processing sequence of an application server migration control unit.

FIG. 4 is a diagram illustrating an exemplary processing sequence of the application server migration control unit 301 of the application server management terminal 101. A process sequence of causing the application servers 102 to 105 in which the old application is being operated to migrate to a new application in a stepwise manner will be described with reference to FIG. 4.

First, in step 401, in order to generate information for deciding an application server that migrates to a new application (hereinafter, referred to as "migration evaluation information"), the application servers 102 to 105 are requested to transmit information including the number of non-completed processes, the statistical information, and the server performance information (hereinafter, referred to as the server information). The application servers 102 to 105 transmit the server information to the application management terminal 101 in steps 420, 430, 440, and 450. The application server migration control unit 301 collects the received server information and generates migration evaluation information.

Then, in step 402, the application server management terminal 101 evaluates the generated migration evaluation information, and decides the application servers 102 and 103 as the migration target server.

Then, in step 403, the prior blockage instruction is given to the application servers 102 and 103 decided as the migration target. The application servers 102 and 103 that have received the prior blockage instruction executes the prior blockage in steps 421 and 431.

Then, in step 404, the application servers 102 and 103 to which the prior blockage instruction is given are requested to transmit the number of non-completed processes in steps 422 and 423 and steps 432, 433, a non-completed process of each application server is monitored, and it is determined that there is no non-completed process for the application server 102.

Then, in step 405, a migration instruction is given to the application server 102 having no non-completed process, and the application server 102 performs migration from an old application to a new application in step 424.

Then, in step 406, the application server 103 that has received the prior blockage instruction but does not migrate to the new application yet is requested to transmit the number of non-completed processes in step 434, monitoring of the non-completed process is resumed, and it is determined that there is no non-completed process for the application server 103.

Then, in step 407, the migration instruction is given to the application server 103 having no non-completed process, and the application server 103 performs the migration from the old application to the new application in step 435.

Then, since all the application servers to which the prior blockage instruction is given has performed the migration, in step 408, the application servers 104 and 105 that do not perform the migration yet are requested to transmit the server information. The application servers 104 and 105 transmit the server information to the application server management terminal 101 in steps 441 and 451. The application server migration control unit 301 collects the received server information and generates the migration evaluation information.

Then, in step 409, the application server management terminal 101 evaluates the generated migration evaluation information, and decides the application server 104 as the migration target server.

Then, in step 410, the prior blockage instruction is given to the application server 104 decided as the migration target. The application server 104 that have received the prior blockage instruction executes the prior blockage in step 442.

Then, in step 411, the application server 104 to which the prior blockage instruction is given is requested to transmit the number of non-completed processes in step 443, a non-completed process is monitored, and it is determined that there is no non-completed process for the application server 104.

Then, in step 412, the migration instruction is given to the application server 104 having no non-completed process, and the application server 104 performs the migration to the new application in step 444.

Then, since all the application servers to which the prior blockage instruction is given have performed the migration, in step 413, the application server 105 that does not perform the migration is requested to transmit the server information. The application server 105 transmits the server information to the application server management terminal 101 in step 452. The application server migration control unit 301 collects the received server information and generates the migration evaluation information.

Then, in step 414, the application server management terminal 101 evaluates the generated migration evaluation information, and decides the application server 105 as the migration target server.

Then, in step 415, the prior blockage instruction is given to the application server 105 decided as the migration target. The application server 105 that have received the prior blockage instruction executes the prior blockage in step 453.

Then, in step 416, the application server 105 to which the prior blockage instruction is given is requested to transmit the number of non-completed processes in steps 454, 455, and 456, a non-completed process is monitored, and it is determined that there is no non-completed process for the application server 105.

Then, in step 417, the migration instruction is given to the application server 105 having no non-completed process, and the application server 105 performs the migration to the new application in step 457.

Through the above process, the migration from the old application to the new application is implemented.

Figure 5:
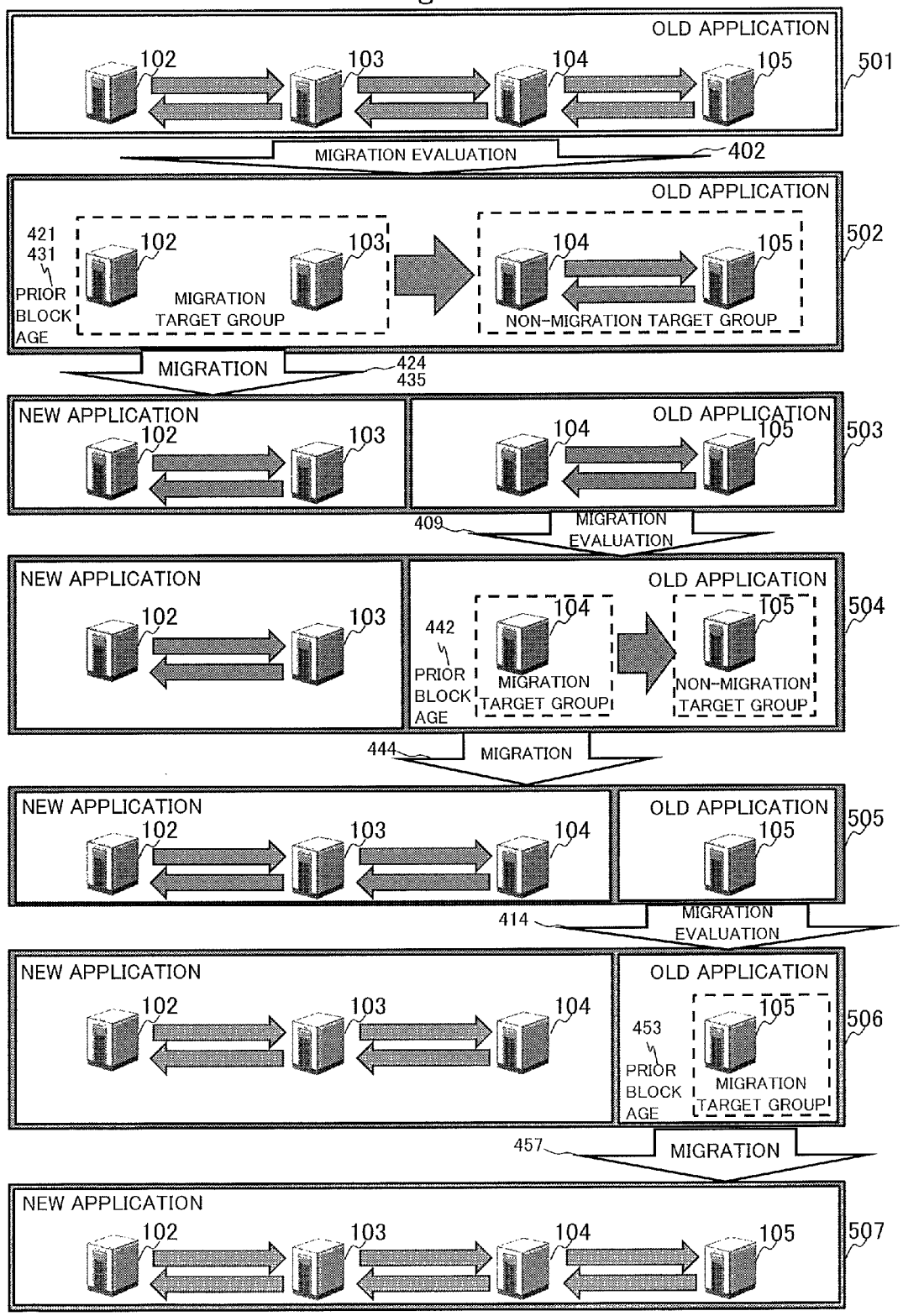
FIG. 5 is a diagram illustrating an example of group transition at the time of application migration.

FIG. 5 is a diagram illustrating an example of group transition when the application servers 102 to 105 perform the migration from the old application to the new application according to the sequence of FIG. 4.

First, in step 501, it is an initial state, and all the application servers 102 to 105 belong to a group of the old application, and transition to a state of step 502 through the migration evaluation of step 402.

In step 502, the group of the old application is divided into sub groups, that is, a migration target group and a non-migration target group, the prior blockage is performed on the application servers 102 and 103 of the migration target group in steps 421 and 431. The application servers that have undergone the prior blockage do not receive the processing requests from the client terminals 108 and 109 and the processing requests from other application servers, and request the application servers of the non-migration target group to perform the process being performed by their own application servers as a subsequent process, and the subsequent process is not performed by its own application server.

Thus, a period of time until all processes in the application server that has undergone the prior blockage are completed is reduced. When all processes in the application servers 102 and 103 that have undergone the prior blockage are completed, the migration is performed in steps 424 and 435, and transition to step 503 is performed.

In step 503, the application servers 102 and 103 that have performed the migration belong to the group of the new application. In the distributed execution platform 300, since it is detected that the same application as the old application is not operating based on a material name of an application that operates and a bash value thereof, it is managed in a different region. For this reason, the processing request of the old application is not transmitted to the application server of the new application group. The migration evaluation is performed on the application servers 104 and 105 of the group of the old application in step 409, and transition to step 504 is performed.

In step 504, the group of the old application is divided into sub groups, that is, a migration target group and a non-migration target group, the prior blockage is performed on the application server 104 of the migration target group in step 442. The application server 104 that has undergone the prior blockage do not receive the processing requests from the client terminals 108 and 109 and the processing requests from the application server 105, and requests the application server of the non-migration target group to perform the process being performed by their own application servers as a subsequent process, and the subsequent process is not performed by its own application server. When all processes in the application server 104 that has undergone the prior blockage are completed, the migration is performed in step 444, and transition to step 505 is performed.

In step 505, the application server 104 that has performed the migration is added to the group of the new application, the group of the old application includes only the application server 105, the migration evaluation is performed on the application server 105 in step 414, and transition to step 506 is performed.

In step 506, the group of the old application decides the application server 105 as the migration target group, and the prior blockage is performed in step 453. The application server 105 that has undergone the prior blockage does not receive the processing requests from the client terminals 108 and 109. Since only the application server 105 that has undergone the prior blockage is included in the group of the old application, the application server 105 performs all processes being performed in its own application server together with the subsequent process. When all processes in the application server 105 that has undergone the prior blockage are completed, the migration is performed in step 457, transition to step 507 is performed, and thus all the application servers belong to the group of the new application.

Figure 6:
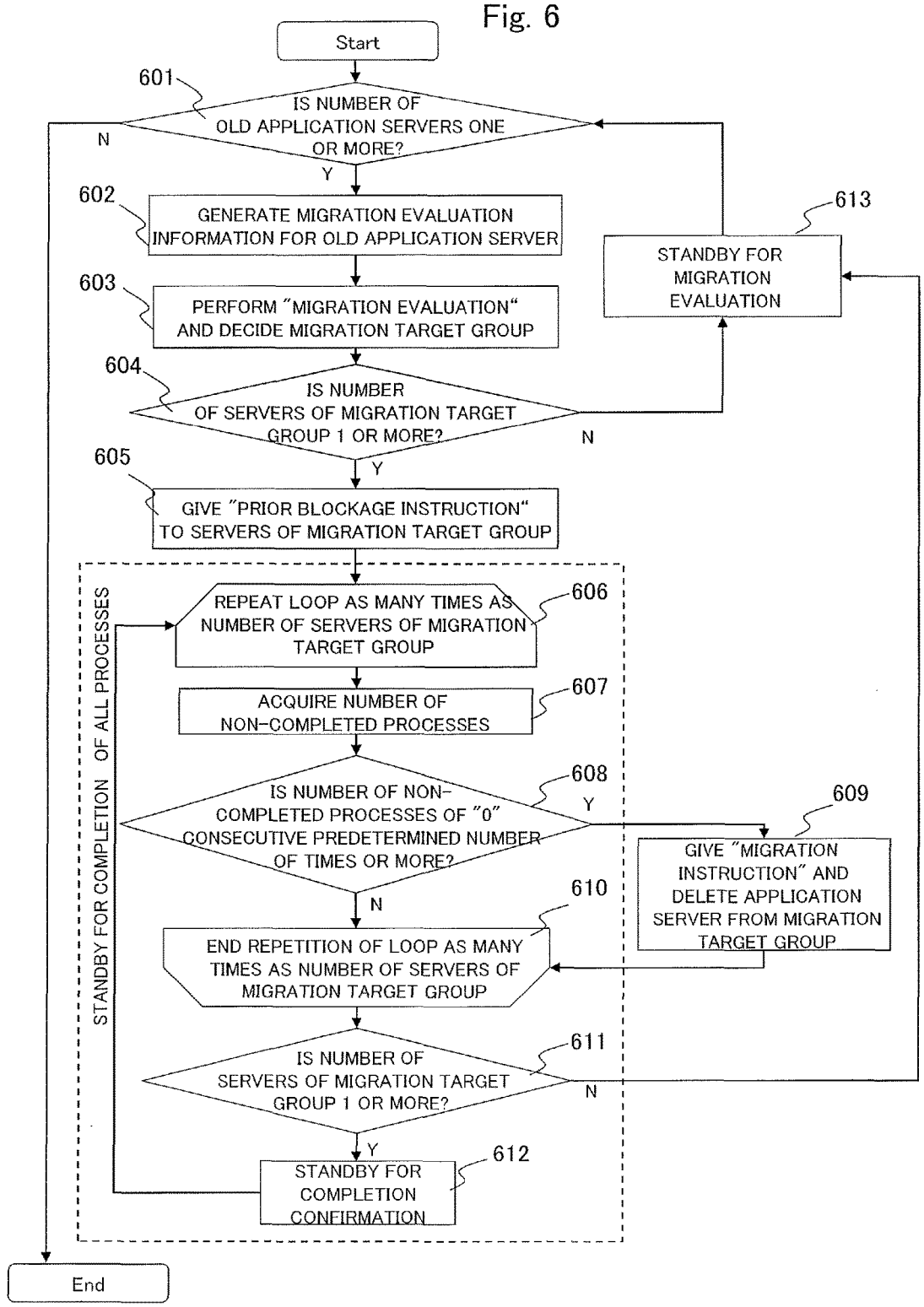
FIG. 6 is a flowchart illustrating an exemplary process performed by an application server migration control unit.

FIG. 6 is a flowchart illustrating an exemplary process performed by the application server migration control unit 301. FIG. 6 illustrates a detailed process when application migration is performed.

First, in step 601, the migration evaluating unit 321 determines whether or not the number of application servers in which the old application is being operated is one or more with reference to the migration status management table (which will be described later with reference to FIG. 10) held in the migration management unit 326. When the number of application servers in which the old application is being operated is one or more, the process proceeds to step 602, and when the number of application servers in which the old application is being operated is neither one nor more (zero), the process ends.

In step 602, the migration evaluating unit 321 acquires the server information (the number of non-completed processes, the statistical information, and the server performance information) from all the application servers in which the old application is being operated, and collects the information and generates the migration evaluation information, and then the process proceeds to step 603.

In step 603, the migration evaluating unit 321 acquires the process execution order from the application flow file of the old application stored in the application flow definition storage unit 325, and performs the migration evaluation with reference to the migration evaluation information generated in step 602 (the detailed migration evaluation will be described later with reference to FIG. 9). As a result of migration evaluation, the number of application servers that performs the application migration is set to zero or more, and the migration target group is decided.

Then, in step 604, the number of servers of the migration target group decided in step 604 is determined, and when the number of servers of the migration target group is one or more, the process proceeds to step 605. On the other hand, when the number of servers of the migration target group is neither one nor more (zero), the process proceeds to step 613 and then proceeds to step 601 after being on standby for a certain period of time.

In step 605, the prior blockage instructing unit 322 acquires the external request receiving adapter (the process adapter A in the example of FIG. 15) from the application flow file of the old application stored in the application flow definition storage unit 325, and gives the prior blockage instruction to all the servers of the migration target group, and the process proceeds to step 606.

The prior blockage instructing unit 322 performs the following processes (1) to (3) to give the prior blockage instruction.

(1) The external request receiving adapter stop instruction is given, and the processing requests of the old application from the client terminals 108 and 109 are not received.

(2) The node blockage instruction is given to the receivable server management unit 304. The receivable server management unit 304 that has received the node blockage instruction gives an instruction to cause the application server of the migration target to enter the "non-receivable state" to the server state management unit 309 of the application server sharing terminal 106. Thus, the receivable server management unit 304 that has received the inquiry about the application server that can receive the processing request of the application from the dispatcher unit 205 does not transmit a response that the application server in the non-receivable state is the receivable application server.

(3) The routing strategy change instruction is given to the routing strategy unit 305, and the logic of selecting a server that performs a process among a plurality of servers is changed. Specifically, the routing strategy is changed such that, when there are a plurality of application servers that can receive a process, a server other than its own server is selected.

Then, repetition of the number of servers of the migration target group starts from step 606, and the process proceeds to step 607.

In step 607, the processing status monitoring unit 323 acquires the number of non-completed processes from the non-completed message storage unit 303 of the application server of the migration target group, and the process proceeds to step 608.

When the number of non-completed processes acquired in step 607 is "0," in step 608, the processing status monitoring unit 323 determines whether or not the number of non-completed processes of "0" is consecutive a predetermined number of times or more, and when the number of non-completed processes of "0" is consecutive a predetermined number of times or more, the process proceeds to step 609. The predetermined number of times is the number of times for certainly checking that there is no process of an application in the application server and may be set to an arbitrary number of times.

In step 609, the migration instructing unit 324 gives the migration instruction to the application server in which the number of non-completed processes of "0" is consecutive a predetermined number of times or more, and deletes the application server from the migration target group.

When the number of non-completed processes of "0" is not consecutive a predetermined number of times or more in step 608, the process proceeds to step 610.

When the repetition of the number of servers of the migration target group ends in step 610, the process proceeds to step 611.

When the number of servers of the migration target group is still one or more in step 611 (that is, when there is a server to which no migration instruction is given among the servers to which the prior blockage instruction is given in step 605), in step 612, it is on standby for a predetermined period of time, and then the process returns to step 606. When the number of servers of the migration target group is neither one nor more in step 611 (that is, when the migration instruction is given to all the servers to which the prior blockage instruction is given in step 605), in order to decide the migration target group again, it is on standby for a predetermined period of time, and then the process returns to step 601.

FIG. 7 is a diagram illustrating an example of the statistical information and the number of non-completed processes included in the server information. The statistical information is generated by the statistical information generating unit 306, the number of non-completed processes is generated by the non-completed message storage unit 303, and the statistical information and the number of non-completed processes are transmitted from the application servers 102 to 105 to the application server management terminal 101 as the server information in steps 420, 430, 440, and 450 of FIG. 4. The server information is generated for every two or more application servers, but FIG. 7 illustrates an example of the server information generated by a predetermined number of application servers. The statistical information includes an average processing period of time, an average CPU period of time, and an average memory use period of time of each process. The information is used for the migration evaluation.

An item number 1 is the number of non-completed processes and the statistical information of the process A and indicates that the average processing period of time per execution is 121 milliseconds (ms), a period of time in which a CPU is used is 15 ms, the memory usage is 1 MB, and the number of currently non-completed processes is 15.

An item number 2 is the number of non-completed processes and the statistical information of the process B and indicates that the average processing period of time per execution is 568 ms, a period of time in which a CPU is used is 65 ms, the memory usage is 3 MB, and the number of currently non-completed processes is 126.

An item number 3 is the number of non-completed processes and the statistical information of the process C and indicates that the average processing period of time per execution is 158 ms, a period of time in which a CPU is used is 6 ms, the memory usage is 2 MB, and the number of currently non-completed processes is 48.

FIG. 8 is a diagram illustrating an example of the server performance information included in the server information. The server performance information is generated by the server information generating unit 311 and transmitted from the application servers 102 to 105 to the application server management terminal 101 as the server information in steps 420, 430, 440, and 450. The server performance information is generated for every two or more application servers, but FIG. 8 illustrates an example of the server performance information related to a predetermined number of application servers.

A maximum of the number of parallel executions indicates that a maximum of 32 processes can be executed in parallel and is used for calculating an expected period of time in which all processes are completed after the prior blockage at the time of the migration evaluation. The number of CPU cores indicates 4 and used for determining whether or not the number of CPU cores for keeping latency is secured at the time of the migration evaluation. A memory amount indicates 8000 MB and used for determining whether or not a memory amount necessary as a system is secured at the time of the migration evaluation.

Figure 9:
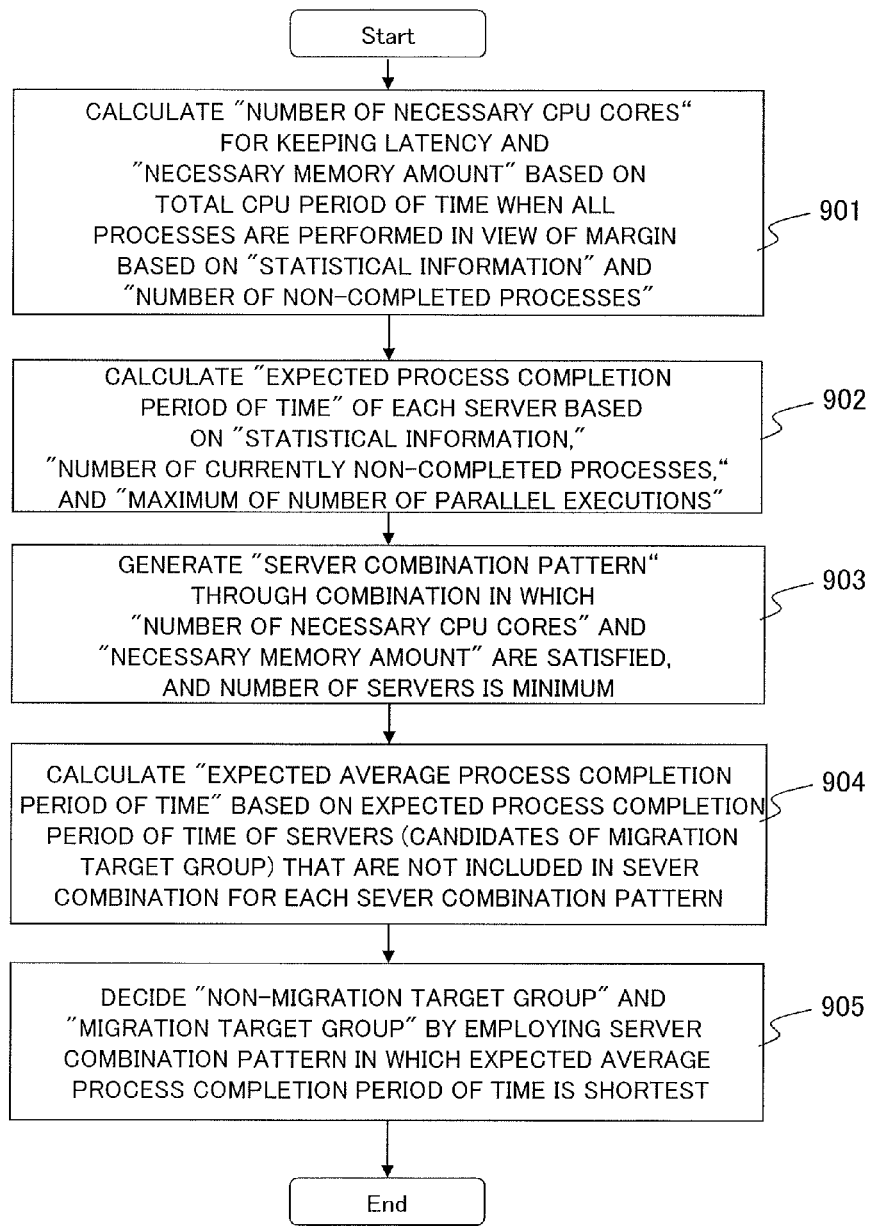
FIG. 9 is a diagram illustrating an exemplary processing flowchart of migration evaluation performed by a migration evaluating unit.

FIG. 9 is a diagram illustrating an exemplary processing flowchart of the migration evaluation performed by the migration evaluating unit 321. The migration evaluation is a process performed in step 402 of FIG. 4 or step 603 of FIG. 6.

First, in step 901, the process execution order is acquired from the application flow file of the old application stored in the application flow definition storage unit 325 based on the average CPU period of time, the average memory usage, and the number of non-completed processes of FIG. 7, and then the number of necessary CPU cores for keeping latency and the necessary memory amount are calculated based on a total CPU period of time when all non-completed processes are performed.

The number of necessary CPU cores will be described in connection with an example in which the four application servers 102 to 105 transmit the same server information as in FIG. 7, latency is 3,000 ms, and a margin of 10% is considered.

A CPU period of time necessary for performing the non-completed process A is "900 ms (=average CPU period of time (15 ms)×number of non-completed processes (15)× number of servers (4))." A CPU period of time necessary for performing the non-completed process B is "36,660 ms (=average CPU period of time (65 ms)×number of non-completed processes (126+15 (added since the process B is performed after the non-completed process A is performed))×number of servers (4))." The same applies hereinafter, but, for example, it is detected that the process B is performed after the process A with reference to the process execution order from the application flow file. A CPU period of time necessary for performing the non-completed process C is "4,536 ms (=average CPU period of time (6 ms)× number of non-completed processes (48+126+15 (added since the process C is performed after the non-completed processes A and B are performed))×number of servers (4))."

An addition result of the CPU periods of time necessary for the processes A to C is "42,096 ms," and the total CPU period of time is "46,305.6 ms" when a margin of 10% is considered. Since the latency is kept to be 3,000 ms, "total CPU period of time 46,305.6 ms/latency 3000 ms" is "15.4352," when digital after the decimal point are rounded up, and thus the number of necessary CPU cores is calculated to be 16.

Then, the necessary memory amount will be described in connection with an example in which the four application servers 102 to 105 transmit the same server information as in FIG. 7, and a margin of 10% is considered.

A memory amount necessary for performing the non-completed process A is "60 MB (=average memory usage (1 MB)×number of non-completed processes (15)×number of servers (4))." A memory amount necessary for performing the non-completed process B is "1,692 MB (=average memory usage (3 MB)×number of non-completed processes (126+15 (added since the process B is performed after the non-completed process A is performed))×number of servers (4))." A memory amount necessary for performing the non-completed process C is "1,512 MB (=average memory usage (2 MB)×number of non-completed processes (48+ 126+15 (added since the process C is performed after the non-completed processes A and B are performed))×number of servers (4))."

An addition result of the memory amounts necessary for performing the processes A to C is "3264 MB," and the necessary memory amount is "3,590.4 MB" when a margin of 10% is considered.

Then, in step 902, an expected process completion period of time of each server is calculated based on the average processing period of time the number of non-completed processes of FIG. 7 and the maximum of the number of parallel executions of FIG. 8. Further, when a sum of the numbers of non-completed processes of all the processes is the maximum of the number of parallel executions or less, the longest period of time among the average processing periods of time is employed.

For example, in the case of the example illustrated in FIGS. 7 and 8, since the sum of the numbers of non-completed processes of all the processes is larger than the maximum of the number of parallel executions, the following calculation is performed. A processing period of time of the process A is "1815 ms (=average processing period of time (121 ms)×number of non-completed processes (15))." A processing period of time of the process B is "71568 ms (=average processing period of time (568 ms)×number of non-completed processes (126))." A processing period of time of the process C is "7584 ms (=average processing period of time (158 ms)×number of non-completed processes (48))." An addition result of the processing periods of time of the processes A to C is "80967 ms." If it is executed using 80967 ms as a multiple of the maximum of the number of parallel executions, and "80967 ms/maximum of the number of parallel executions (32)" is calculated, the expected process completion period of time in the present application server can be calculated to be "2,530.218 ms." The expected process completion period of time in each of all the application servers 102 to 105 is calculated as described above.

Then, in step 903, the performance information of the application servers of FIG. 8 is compared with the number of necessary CPU cores and the necessary memory amount calculated in step 901, a combination pattern of application servers in which the number of necessary CPU cores and the necessary memory amount are satisfied, and the number of severs is minimum (hereinafter, referred to as a "server combination pattern") is generated, and the process proceeds to step 904.

Then, in step 904, an average value of the expected process completion periods of time of severs that are not included in the combination (servers serving as candidates of the migration target group) which are calculated in step 902 (hereinafter, referred to as an "expected average process completion period of time") is calculated for each server combination pattern generated in step 903, and the process proceeds to step 905.

Then, in step 905, the server combination pattern in which the expected average process completion period of time calculated in step 904 is shortest is selected, the application server that is included in the selected server combination pattern is decided in the non-migration target group, and the application server that is not included in the server combination pattern is decided as the migration target group.

Through such migration evaluation, it is possible to decide the application server of the migration target group among the application servers in which the old application is being operated. As described above with reference to the flow of FIG. 6, when the application server of the migration target group is decided, the prior blockage instruction is performed on the application server (step 605), and then the migration process is performed.

FIG. 10 is a diagram illustrating an example of the migration status management table. The migration management unit 326 holds the migration status management table, and manages the migration status of the application server from the old application to the new application. An item number 1 indicates that the application server 102 is operating the new application, and the migration is completed. An item number 2 indicates that the application server 103 is operating the new application, and the migration is completed. An item number 3 indicates that the prior blockage instruction is given to the application server 104, and completion of all processes in the server is monitored. An item number 4 indicates that the application server 105 is operating the old application and not selected as the migration target group yet.

Figure 11:
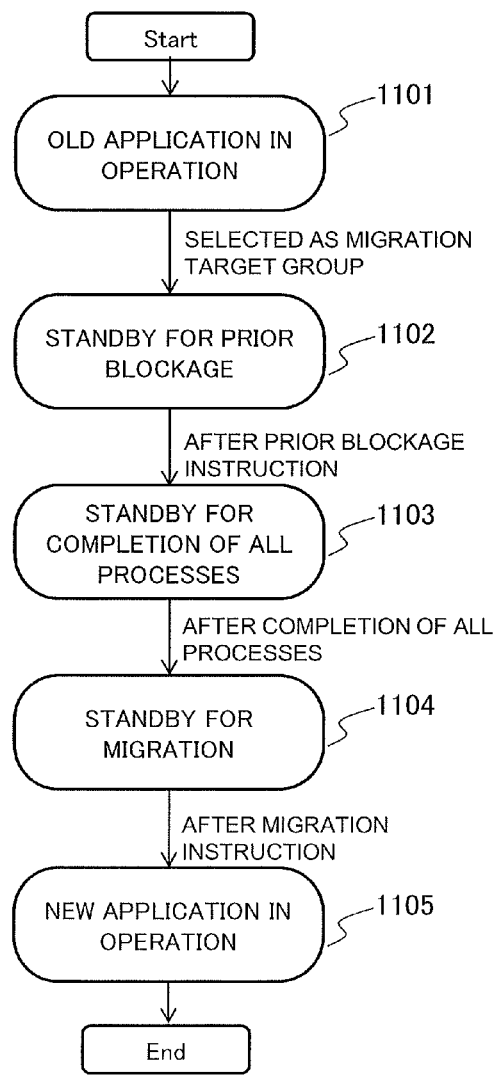
FIG. 11 is a diagram illustrating an example of state transition of a migration status management table.

FIG. 11 is a diagram illustrating an example of state transition of the migration status management table. Step 1101 indicates that the application server is in the initial state and operating the old application, and the application migration is not performed. When the application server is selected as the migration target group through the migration evaluation performed in step 603 of FIG. 6, the migration status management table is updated, and transition to a prior blockage standby state of step 1102 is performed. When the prior blockage instruct is given in step 605 of FIG. 6, the migration status management table is updated, and transition to an all-process completion standby state of step 1103 is performed. When all the processes performed by the application server are completed, and the number of non-completed processes of "0" is consecutive a predetermined number of times or more in step 608 of FIG. 6, the migration status management table is updated, transition to a migration standby state of step 1104 is performed. Then, when the migration instruction is given in step 609 of FIG. 6, the migration status management table is updated, and transition to a new application operation state of step 1105 is performed.

Figure 12:
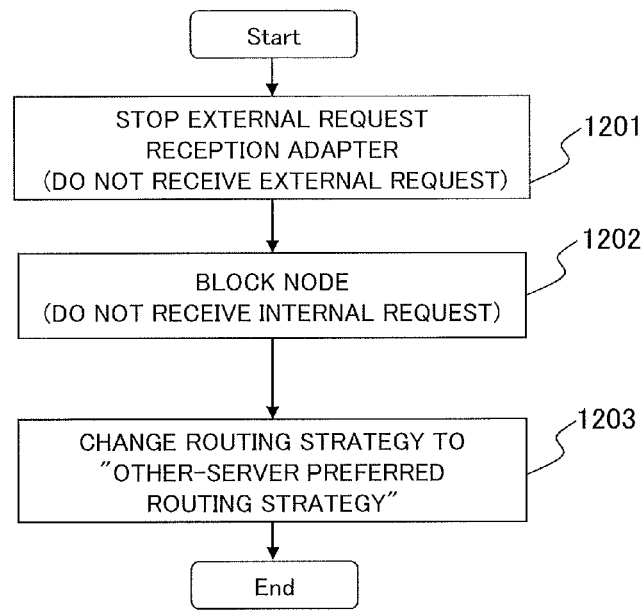
FIG. 12 is a flowchart illustrating an example of a prior blockage operation of an application server.

FIG. 12 is a flowchart illustrating an example of the prior blockage operation of the application server performed in steps 421 and 431 of FIG. 4. The prior blockage operation of the application server is performed by the prior blockage instruction given from the migration instructing unit 324, and an operation flow of FIG. 12 corresponds to the processes (1) to (3) associated with the prior blockage instruction described above in step 605 of FIG. 6.

First, in step 1201, the adapter unit 203 that has received the prior blockage instruction stops the external request receiving adapter (the process A adapter in FIG. 2) to close the channel so that an application execution request is not received from the outside (the client terminals 108 and 109 or the like), and the process proceeds to step 1202.

Then, in step 1202, the receivable server management unit 304 that has received the prior blockage instruction gives a notification indicating that its own application server is in the prior blockage state to the server state management unit 309 of the application server sharing terminal 106. As a result, its own application server is excluded from the receivable servers in which the receivable server management unit 304 of other application servers transmits the response to the dispatcher unit 205. Thus, other application servers are unable to transmit the processing request to the application server in the prior blockage state.

Then, in step 1203, the routing strategy unit 305 that has received the prior blockage instruction changes the routing strategy to the other-server preferred the routing strategy. As a result, for example, when the process A is being performed, if the process B adapter subsequent thereto generates the process B message, and transmits the process B message to the dispatcher unit 205, the processing request of the process B serving as the subsequent process is preferentially transmitted to other application servers, and its own server does not perform the subsequent process. Thus, the process of its own server can be completed early.

Figure 13:
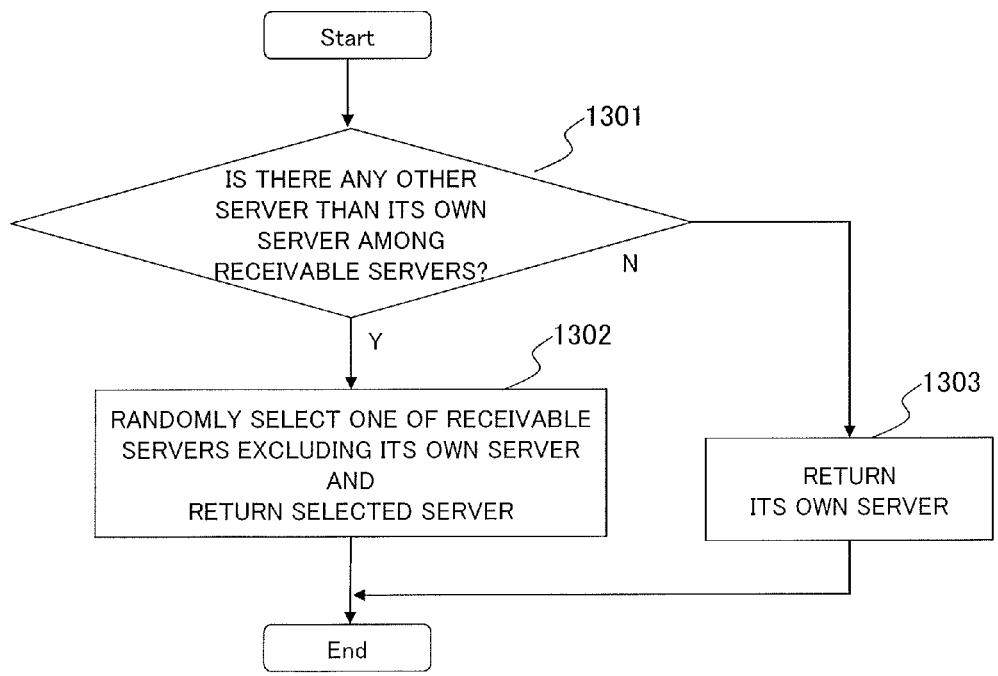
FIG. 13 is a flowchart illustrating an exemplary process of an other-server preferred routing strategy.

FIG. 13 is a flowchart illustrating an exemplary process of the other-server preferred routing strategy. First, in step 1301, the routing strategy unit 305 determines whether or not there is any other server than its own server among the receivable servers to which the receivable server management unit 304 has transmitted the response, and when there is another server than its own server, in step 1302, the routing strategy unit 305 randomly selects one of the application servers other than its own server. When there is only its own server, in step 1303, its own server is returned.

Figure 14:
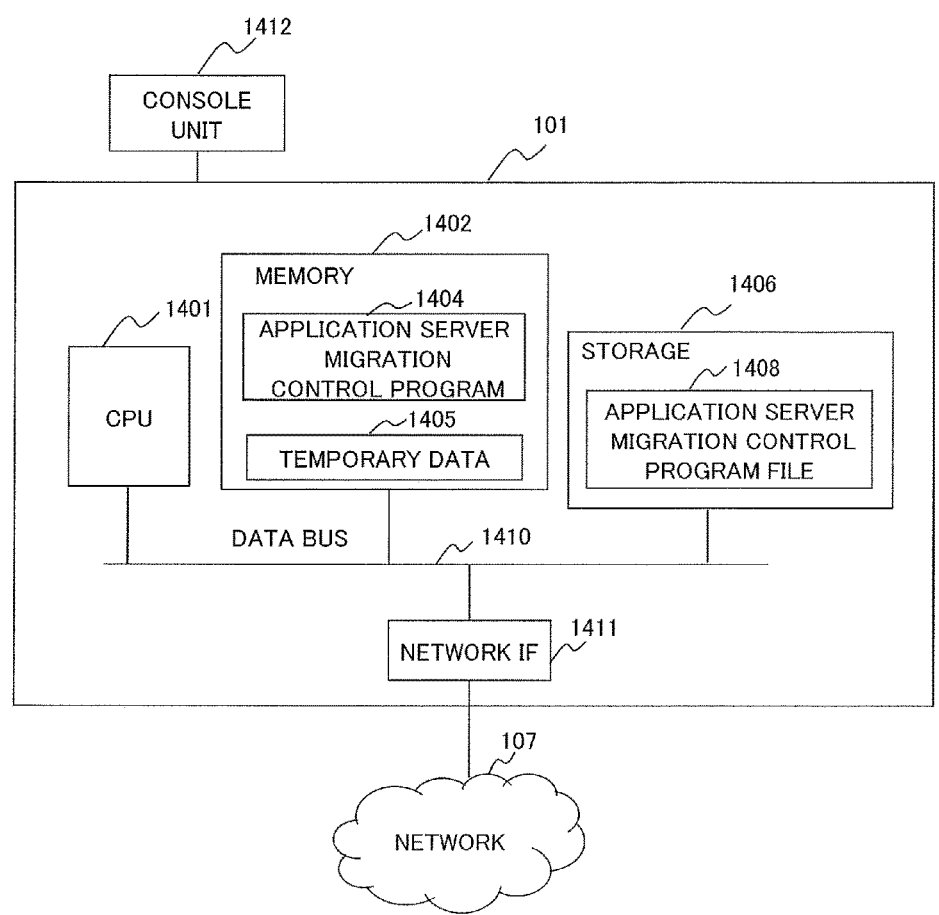
FIG. 14 is a diagram illustrating an exemplary physical configuration of an application server management terminal.

FIG. 14 is a diagram illustrating an exemplary physical configuration of the application server management terminal 101. A CPU 1401, a memory 1402, a storage 1406, and a network IF 1411 are connected to one another via a data bus 1410, and perform communication via the data bus 1410. The network IF 1411 is connected to the network 107.

The application server migration control unit 301 illustrated in FIG. 3 is stored in the storage 1406 as an application server migration control program file at a normal time. When the application server migration is actually performed, it is developed from an application server migration control program file 1408 of the storage 1406 onto the memory 1402 via the data bus 1410 according to a command of the CPU 1401 and executed according to a command of the CPU 1401. The application server migration control program file 1408 is developed onto the memory 1402 as an application server migration control program 1404. Temporary data 1405 is temporary storage data, and necessary data is stored at the time of operation, referred to or updated as necessary, and deleted after the application server migration control unit 301 ends. Similarly to the application server migration control unit 301, the application flow definition storage unit 325 and the migration management unit 326 are also stored in the storage 1406 as a program file and developed onto the memory 1402 and executed according to a command of the CPU 1401. The network IF 1411 connects communication with the terminal in each application server illustrated in FIG. 1 via the network 107.

Each of the application servers 102 to 105, the application server sharing terminal 106, and the client terminals 108 and 109 similarly has physical components such as a CPU, a memory, a storage, and a network IF, and implements the respective function units by developing a program file stored in the storage onto a memory and executing the program file through the CPU.

As described above, according to the present embodiment, the prior blockage is performed on a server that is determined to be able to perform migration in the shortest period of time based on performance of each application server that performs migration, the statistical information of each process, the number of currently non-completed processes, or the like, and completion of all processes is checked with a high degree of certainty. Further, even when a process of an application is being performed, if the prior blockage is performed, other servers that are not a migration target are requested to perform a subsequent process, and thus it is possible to reduce a degeneracy period of time of a system.

REFERENCE SIGNS LIST

101 application management terminal
102 to 105 application server
106 application server sharing terminal
107 network
108,109 client terminal
200 application
203 adapter unit
204 message processor unit
205 dispatcher unit
210 process A adapter
211 process A message
212 process A message processor
213 process B adapter
214 process B message
215 process B message processor
216 process C adapter
217 process C message
218 process C message processor
301 application server migration control unit
302 management console unit
303 non-completed message storage unit
304 receivable server management unit
305 routing strategy unit
306 statistical information generating unit
307 statistical information storage unit
308 other application server process request management unit
309 server state management unit
310 application execution requesting unit
311 server information generating unit
321 migration evaluating unit
322 prior blockage instructing unit
323 processing status monitoring unit
324 migration instructing unit
325 application flow defining unit
326 migration management unit

The invention claimed is:
1. A distributed processing system, comprising:
a plurality of application servers; and
a management device,
wherein the application server includes an application portion and a distributed execution platform portion,
the application portion includes
an adapter unit that receives an execution request of an application from a client terminal, and transmits a message of a processing request of the application to the distributed execution platform portion, and
a processor unit that performs a process of the application in response to a request from the distributed execution platform,
the distributed execution platform portion includes
a dispatcher unit that holds the message transmitted from the adapter unit, and selects an application server that performs the process of the application requested through the message according to a routing strategy, and
a statistical information storage unit that holds statistical information of each process of the application by the application server, and
the management device includes
a migration management unit that manages a migration status of the application for every two or more application servers, and
a migration evaluating unit that decides a migration target server group based on performance information of the application server, statistical information of each process of the application, and the number of non-completed processes of each process calculated based on the number of messages held in the dispatcher unit for the application server in which the migration status is an old application operation state.

2. The distributed processing system according to claim 1, wherein after the process of the application is performed, when there is a process subsequent to the process, the processor unit transmits an execution request for the subsequent process to the adapter unit,
when the execution request for the subsequent process is received, the adapter unit transmits a message of a processing request of the subsequent process to the distributed execution platform portion,
the management device includes a definition storage unit that manages an execution order of the process and the subsequent process when the execution request of the application is received from the client terminal, and
the migration evaluating unit calculates the number of non-completed processes by adding the number of messages held in the dispatcher unit to the number of processes subsequent to the process requested through the message.

3. The distributed processing system according to claim 2, wherein the migration evaluating unit generates a combination pattern of application servers in which the number of servers necessary for performing processes of the application corresponding to the number of non-completed processes is minimum based on the performance information, the statistical information, and the number of non-completed processes, and decides an application server included in a combination pattern in which an expected completion period of time of a process included in an application server not included in the combination pattern is shortest as the migration target server group.

4. The distributed processing system according to claim 3, wherein the adapter unit includes a first adapter that receives the execution request of the application from the client terminal and a second adapter that receives an execution request of a process from the processor unit, the management device includes an instructing unit that gives a prior blockage instruction to an application server included in the migration target server group decided by the migration evaluating unit, the dispatcher unit of the application server that has received the prior blockage instruction changes the routing strategy to select an application server other than the application server of the dispatcher unit when there are a plurality of candidates of an application server that performs the process, and the adapter unit of the application server that has received the prior blockage instruction stops the first adapter.

5. The distributed processing system according to claim 4, further comprising, a server sharing device that manages states of a plurality of application servers, and notifies the application server of an application server that is able to perform the process of the application, the dispatcher unit of the application server that has received the prior blockage instruction gives a notification indicating that the application server of the dispatcher unit is unable to perform the process of the application to the server sharing device, the server sharing device updates the state of the application server, and transmits an updated executable application server list to another application server, and the dispatcher unit of the other application server selects an application server that performs the process according to the routing strategy among the received executable application server list.

6. The distributed processing system according to claim 5, wherein the management device includes a monitoring unit that monitors the number of messages held in the dispatcher unit of the application server that has received the prior blockage instruction from the instructing unit, and a migration unit that gives an instruction to perform application migration to an application server in which the number of messages monitored by the monitoring unit is zero, and the migration management unit updates the application server that has received the instruction to perform the application migration from the migration unit to a new application operation state.

7. The distributed processing system according to claim 6, wherein after the migration unit gives the instruction to perform the application migration to all application servers to which the instructing unit gives the prior blockage instruction, and the migration evaluating unit acquires the performance information of the application server, the statistical information of each process of the application, and the number of non-completed processes of each process calculated based on the number of messages held in the dispatcher unit for the application server in which the migration status is an old application operation state again, and decides a new migration target server group.

8. The distributed processing system according to claim 7, wherein the migration unit gives the instruction to perform the application migration to an application server in which the number of messages monitored by the monitoring unit is zero consecutively a predetermined number of times.

* * * * *